US008453419B2

(12) United States Patent
Roithmeier et al.

(10) Patent No.: US 8,453,419 B2
(45) Date of Patent: Jun. 4, 2013

(54) METHOD AND DEVICE FOR STRETCH BLOW MOLDING OR BLOW MOLDING AND FILLING STERILE CONTAINERS

(75) Inventors: Stefan Roithmeier, Neutraubling (DE); Christian Stoiber, Michelsneukirchen (DE); Franz Braun, Schwandorf (DE); Michael Dahmen, Regensburg (DE); Patrick Engelhard, Elsendorf (DE); Thomas Hollriegl, Teublitz (DE); Roland Laumer, Regensburg (DE); Jurgen Sollner, Beratzhausen (DE); Michael Neubauer, Regensburg (DE)

(73) Assignee: Krones AG, Neutraubling (DE)

( * ) Notice: Subject to any disclaimer, the term of this patent is extended or adjusted under 35 U.S.C. 154(b) by 306 days.

(21) Appl. No.: 12/879,056

(22) Filed: Sep. 10, 2010

(65) Prior Publication Data

US 2011/0061343 A1    Mar. 17, 2011

(30) Foreign Application Priority Data

Sep. 11, 2009 (DE) .......................... 10 2009 041 215

(51) Int. Cl.
*B65B 3/02* (2006.01)
(52) U.S. Cl.
USPC ................ 53/426; 53/433; 53/111 R; 53/511; 53/561
(58) Field of Classification Search
USPC ................ 53/425, 426, 433, 111 R, 511, 561
See application file for complete search history.

(56) References Cited

U.S. PATENT DOCUMENTS

| | | | |
|---|---|---|---|
| 3,563,256 A | 2/1971 | Babunovic | |
| 4,667,690 A | 5/1987 | Hartnig | |
| 6,119,433 A * | 9/2000 | Kitahora et al. | 53/167 |
| 6,298,638 B1 * | 10/2001 | Bettle | 53/452 |
| 7,900,422 B2 * | 3/2011 | Fischer | 53/426 |
| 2001/0010145 A1 * | 8/2001 | Tawa et al. | 53/425 |
| 2004/0187444 A1 * | 9/2004 | Hutchinson et al. | 53/453 |
| 2009/0071104 A1 * | 3/2009 | Fischer | 53/426 |
| 2009/0293429 A1 * | 12/2009 | Till | 53/425 |

(Continued)

FOREIGN PATENT DOCUMENTS

| | | |
|---|---|---|
| DE | 102006053193 A1 | 5/2008 |
| DE | 102007017938 A1 | 10/2008 |

(Continued)

OTHER PUBLICATIONS

European Search Report for 10171691.8, dated Jan. 20, 2011.

(Continued)

*Primary Examiner* — Hemant M Desai
(74) *Attorney, Agent, or Firm* — Marshall, Gerstein & Borun LLP

(57) ABSTRACT

A method for blow molding and filling sterile containers of preforms in a container treatment device containing a blow module, in which the preforms are transferred from a heating device to the blow module via transport devices, and the containers are transported to a filling machine and filled, where a sterilization treatment is performed each at the preforms and the containers, a main sterilization treatment is performed at the preforms between the heating device and the blow module, and only a subsequent sterilization treatment is performed at the containers on the transport path to the filling machine. Further, a device having a main sterilization module between the heating device and the blow module, and a subsequent sterilization module between the blow module and the filling machine.

10 Claims, 7 Drawing Sheets

U.S. PATENT DOCUMENTS

| | | | |
|---|---|---|---|
| 2010/0047120 A1 | 2/2010 | Adriansens et al. | |
| 2010/0077701 A1* | 4/2010 | Ehmer | 53/425 |
| 2010/0095639 A1* | 4/2010 | Hohenhorst et al. | 53/452 |
| 2010/0170867 A1* | 7/2010 | Hayakawa | 215/379 |
| 2010/0199604 A1 | 8/2010 | Fischer | |

FOREIGN PATENT DOCUMENTS

| | | | |
|---|---|---|---|
| EP | 1012047 A1 | 6/2000 | |
| EP | 1122168 A1 | 8/2001 | |
| EP | 1837157 A2 | 9/2007 | |
| EP | 1896245 A1 | 3/2008 | |
| FR | 2766169 A | 1/1999 | |
| FR | 2814095 A1 | 3/2002 | |
| JP | 03290226 A | 12/1991 | |
| WO | WO-9847770 A1 | 10/1998 | |
| WO | WO-2007140883 A1 | 12/2007 | |
| WO | WO-2008055685 A1 | 5/2008 | |
| WO | WO-2009052800 A1 | 4/2009 | |

OTHER PUBLICATIONS

German Search Report for 10 2009 041 215.8, dated Mar. 7, 2012.
Notification of First Office Action, The State Intellectual Property Office of P.R. China, for 201010283745.5, dated Feb. 4, 2013.

* cited by examiner

METHOD AND DEVICE FOR STRETCH BLOW MOLDING OR BLOW MOLDING AND FILLING STERILE CONTAINERS

CROSS-REFERENCE TO RELATED APPLICATION

The present application claims the benefit of priority of German Application No. 102009041215.8, filed Sep. 11, 2009. The entire text of the priority application is incorporated herein by reference in its entirety.

FIELD OF THE DISCLOSURE

The disclosure relates to a method and to a device for stretch blow molding or blow molding and filling of sterile containers, such as in bottling operations.

BACKGROUND

In the method known from DE 10 2006 053 193 A, the containers blow molded or stretch blow molded from the preforms are sterilized on the transport path between the blow module and the filling machine. In the process, first a sterilization treatment is performed on the inner surfaces, then a sterilization treatment is performed on the outer surfaces in an external tunnel, and finally sweeping with sterile air is performed. The apparatus and control complexity for the sterilization treatment is high. For example, treatment stars with lifting devices involving complex control system are required, and relative low pressures and temperatures must be employed as the blow molded containers comprise thin walls and large surfaces. The device suited for carrying out the method is large and includes very long transport paths, especially for the containers.

In the method known from EP 1 896 245 A, two sterilization treatments are already performed at the preforms on the transport path to the blow module, that means a first sterilization treatment upstream of the heating device, and another sterilization treatment downstream of the heating device. However, especially in the blow module, so many components come into contact with the preforms and the containers which cannot be brought to a sterile state with reasonable efforts, that the containers are possibly contaminated again during filling. However, this known method considers the fact that a sterilization treatment of the preforms can be carried out relatively aggressively and therefore efficiently in view of the employed pressure and the temperatures as the preforms with a relatively thick wall thickness have smaller surfaces and are brought to a temperature advantageous for the sterilization treatment, and possible residues are largely removed during blow molding or stretch blow molding by exchanging the air volume. Finally, for the medium used in the sterilization treatment, one can choose a higher temperature due to the ruggedness of the preform, increasing the efficiency of the sterilization treatment.

In the method known from WO 2009/052800 A, a first sterilization treatment is performed at the preforms on their transport path to the heating device into the heating device with energy beams generated by generators, and another sterilization treatment is performed at the containers along the transport path of the containers from the blow module to a discharge section of the blow module, again with energy beams of a generator. The preforms can be contaminated again in the heating device, and the containers can be contaminated in the blow molds and on the transport path to the filling machine.

In the method known from EP 0 996 530 A, the preforms and the containers are each subjected to a sterilization treatment. The sterilization treatment of the preforms is already effected upstream of the heating device and into the heating device, or between the heating device and the blow module. The sterilization treatment of the containers is effected as a completion of the blow molding, so that these can be subsequently contaminated again.

SUMMARY OF THE DISCLOSURE

One aspect underlying the disclosure is to provide a method of the type mentioned in the beginning and a device suited for performing the method, which permit to produce reliably sterile containers with only little efforts as to the equipment and the control system and an only moderate space requirement for filling.

By carrying out the main sterilization treatment at the preforms, of which the high-temperature surface of the preform to be treated is relatively small and rugged, the operation can be more aggressive and thus efficient, so that the containers coming out of the blow module already fulfill a largely sterile standard and the subsequent sterilization treatment can be relatively simple, to also make the containers really sterile, i.e. that in the subsequent sterilization treatment, at most only dust and possibly residues of the medium from the main sterilization treatment must be removed. However, the risk of residues from the main sterilization treatment remains extremely low, as in the blow module a multiple exchange of the air volume takes place which also removes possibly existing residual components. As due to the ruggedness of the preforms, e.g. if a gaseous or liquid medium is used for the sterilization treatment, high temperatures and pressures can be employed in the operation, only a relatively short transport section is required for the main sterilization treatment. For the subsequent sterilization treatment of the containers carried out as a precaution, too, only little time and equipment are required, for example, no blow-out stars or processing stars with lifting controls are required, which are indispensable if exclusively the containers are subjected to sterilization treatment. Thus, the efforts as to the equipment and thus also to the control system for performing the method can be reduced.

Due to the facilitation of the equipment and shorter transport sections, the device requires less space for performing the sterilization treatments. The omission of blow-out stars or processing stars with lifting controls reduces the efforts as to the equipment and control system. The main sterilization treatment is already carried out no thoroughly that the preforms reach the blow module in a practically sterile state, and possible residues of previously used media disappear anyway due to the high temperatures and the air exchange during blow molding or stretch blow molding, so that the subsequent sterilization module can be designed to be relatively compact, as the residence time of the containers there is short.

As according to the method the main sterilization treatment can be carried out relatively aggressively utilizing the ruggedness of the preforms and their high temperature, and already largely sterile preforms can be achieved, in the subsequent sterilization treatment, the procedure can be less aggressive and also relatively short. Here, different technologies for the sterilization treatments can be employed and combined universally. For example, in the main sterilization treatment, a gaseous medium, preferably thermally treated hydrogen peroxide in a gaseous or vaporous state, and relatively high temperatures and pressures are employed in the operation, while the subsequent sterilization treatment either also employs this gaseous medium, then possibly at a lower temperature and lower pressure, and/or a liquid medium, preferably on the basis of peracetic acid, mainly to reliably remove contaminations and dusts possibly introduced in the blow module.

As another alternative, a sterilization treatment with electron beams offers itself due to the increased efficiency. This sterilization treatment can be employed as main sterilization treatment and as subsequent sterilization treatment, or electron beams are only employed in the main sterilization treatment, while in the subsequent sterilization treatment, a gaseous medium and/or a liquid medium is employed, as largely sterile preforms are already achieved in the main sterilization treatment.

At least the main sterilization treatment should be carried out in a clean room environment to exclude or minimize the introduction of contaminations and germs from outside. In the clean room environment, a higher clean room pressure can be built up than the pressure prevailing upstream and downstream of the clean room environment, so that no contaminations and/or germs circulating upstream or downstream penetrate the clean room environment.

In an appropriate method variant, at least the main sterilization treatment is carried out at a treatment star which is arranged in a treatment chamber which provides enclosure down to transfer areas, where the treatment chamber is in turn preferably positioned in the clean room environment. Here, a sterile air flow can be permanently introduced into the treatment chamber which is preferably blown off or extracted via exhaust air boxes surrounding the transfer areas, so that a kind of lock effect results in the treatment chamber in the upstream and downstream directions. The sterile air flow can also be a gaseous H2O2 mixture.

To permit to keep the clean room environment clean with relatively little efforts, it is appropriate to discharge the exhaust air from the treatment chamber to the outside or to extract it by bypassing the clean room environment. For in the main sterilization treatment and/or the subsequent sterilization treatment, contaminations or germs are released which could contaminate the environment with the exhaust air. For it is not ensured in each case that e.g. all germs could be immediately killed.

In an appropriate embodiment of the device, the main sterilization module is inserted on the transport path of the preforms between the transport device supplying the preforms from the heating device, and a transport device loading the blow module, and the subsequent sterilization module is inserted on the transport path of the containers between a transport device removing the containers from the blow module and a transport device transferring the containers into the filling machine. Here, the transport paths for the preforms and the containers have to be extended only slightly due to the two modules. The modules fit in the process flow without any problems.

Appropriately, the main sterilization module and/or the subsequent sterilization module each comprise a treatment star, and either supply and application means for gaseous or liquid media, or at least one electron beam generator for applying electron beams onto and/or into the preforms or the containers, respectively. The treatment star can offer a relatively long treatment section to efficiently treat the preforms or containers, respectively, while it only requires little space. Here, the room surrounding the treatment star e.g. in a treatment chamber can be kept small and contain a relatively high concentration at least of the gaseous medium to exclude an incidental admission of contaminations and/or germs to the treatment star.

Appropriately, the treatment star is arranged in a treatment chamber connected to an aeration source with exhaust air boxes covering supply and discharge transitional areas. The treatment chamber forms an efficient shield in the sterilization treatment. The risk of the admission of impurities or germs into the treatment chamber can be further reduced if the treatment chamber with the exhaust air boxes is preferably arranged in a clean room environment which is, for example, allocated to the blow module or the filling machine. The clean room environment is appropriate for the high hygienic requirements during filling, and for those of the blow module itself.

In a structurally simple appropriate embodiment, the exhaust air boxes are provided with adjustable exhaust air valves, preferably flap valves, and preferably even connected to an exhaust air removal bypassing the clean room environment of the treatment chamber to the outside. The exhaust air valves permit to precisely, and optionally even differently, adjust the respective exhaust air flows depending on the process flow, to allow for the pressure conditions upstream and downstream of the treatment chamber. The exhaust air removal excludes contamination of the clean room environment from inside. An extraction of the exhaust air from the treatment chamber and/or the clean room environment can be even provided to ensure concretely defined flow and pressure conditions in the treatment chamber as well as in the clean room environment.

In a structurally simple embodiment, the application means for a gaseous and/or liquid medium comprise each one bell body open at the bottom each which is arranged at the treatment star and comprises inner baffle surfaces for an external treatment of the preform or of the container, respectively, and a central nozzle including a nozzle opening arranged inclined to the side with respect to the axis of the preform or of the container. The inclined arranged nozzle opening directs the medium laterally against the inner wall of the preform or of the container, so that the complete inner wall is hit relatively quickly and intensively, and the flow resulting therefrom can also exit from the mouth relatively freely. After having exited from the mouth of the preform or of the container, the flow is turned at the baffle surfaces in the bell body and directed onto the mouth region from outside to also correspondingly act on it. It is also conceivable to design the nozzle such that the flow is introduced into the preform or the container in a circulating manner.

In an appropriate embodiment, the bell body can be arranged at a lifting control device of the treatment star to be lifted and lowered relative to a fixation for the preform or the container, on the one hand be to able to perform the sterilization treatment as intensively as possible, and on the other hand not to affect manipulations during accepting and discharging the preform or the container, respectively.

In a structurally simple manner, the bell body is aligned in the subsequent sterilization module at the treatment star to a fixation for the container and stationarily mounted such that between the mouth of the container positioned in the fixation and the bottom side of the bell body and the nozzle opening, a manipulation gap is formed. This manipulation gap only permits to laterally accept and discharge the container without any collisions with the bell body, although it does not require any lifting control devices, which highly facilitates the treatment star as to its construction and control. Moreover, in the subsequent sterilization module, no blow-out star, optionally also with lifting controls or baffle devices, is required as it was in the past, as with the bell body and the nozzle, residuals can be reliably expelled.

To nevertheless be able to reliably control the discharge of the container, in a further embodiment, the fixation can be a clamp gripper acting below a supporting ring at the container which securely holds the container at the treatment star in the subsequent sterilization treatment. At least in the discharge region from the treatment star to the subsequent transport device, as a precaution, a stationary guiding-out finger can be mounted underneath or above the motion path of the clamp gripper at the treatment star, which extends diagonally with respect to the motion path of the container held in the clamp gripper and can be brought into guiding-out action against the side of the container facing away from the transport device. The guiding-out finger permits a reliable operation of the transfer of the container, without having to further touch the container. The guiding-out finger can moreover be analogously also employed in the treatment star in the main sterilization module to avoid that during the discharge of the preform, auxiliary means involving the risk of contamination and/or deformation are touched.

In a further appropriate embodiment, the bell body in the main sterilization module comprises several narrow bearing struts in the open bottom side, or the bell body is attached with the open bottom side on a plate that is exchangeably mounted in the treatment star, the plate comprising the bearing struts, where between the bearing struts wide cross-flow passages to and from the baffle surfaces of the bell body are defined. The bearing struts thus do not hinder the redirection of flow also desirable for the external treatment of the preform, but they permit to stably clamp the preform on the fixation as soon as they rest on the mouth. Appropriately, the bearing struts gradually recede from a peripheral edge to the nozzle, so that the nozzle opening or a portion of the nozzle extends downwards with respect to the bearing struts. By this inclined arrangement of the bearing struts, the bell body can be positioned deep enough for gripping over the mouth of the preform in the set-down direction, and the flow redirected at the baffle surfaces at least thoroughly acts on the upper region of the outer side of the preform, while at the same time the nozzle penetrates into the mouth of the preform with the nozzle opening.

As thus the bell body cooperates in the fixing of the preform at the treatment star, which is appropriate in particular in the transfer from the supplying transport device and in the treatment, the fixation for the preform only has to comprise supporting fingers for the supporting ring of the preform at the treatment star onto which the supporting ring is placed, while the bell body is placed onto the mouth and presses the supporting ring onto the supporting fingers. The supporting fingers are appropriately arranged at a replaceable supporting plate at the treatment star to keep the change-over time for changing to another preform as short as possible. Between the supporting fingers, cross-flow passages to a clearance zone below are preferably defined, so that the redirected flow acting on the external surface of the preform at least in the mouth region can act efficiently. The lifting control device for moving the bell body relative to the fixation at the treatment star appropriately comprises at least one guide element supporting the bell body which is movably guided in the treatment star and is movable via a jockey wheel by means of a cam control. The cam control appropriately acts such that the lowered bell body fixes a preform on the fixation when the same is taken over, but that it is already lifted before the discharge of the preform, so that the preform can be easily transferred, optionally with the cooperation of the already mentioned guiding-out finger. The fixation of the preform can be particularly easily effected by a preform fixing spring which acts on the guide element or the jockey roller in the set-down direction of the bell body onto the mouth of the preform. This is a particularly simple fixing mechanism which is released by the lifting control means.

To minimize the operational risk of the device, it can be furthermore appropriate for at least the energy beam generator, or even the complete module, to be arranged in a shielded radiation maze in the main sterilization module and/or in the subsequent sterilization module working with energy beams.

BRIEF DESCRIPTION OF THE DRAWINGS

With reference to the drawings, embodiments of the subject matter of the disclosure will be illustrated. In the drawings.

DETAILED DESCRIPTION OF THE PREFERRED EMBODIMENT

Figure 1:
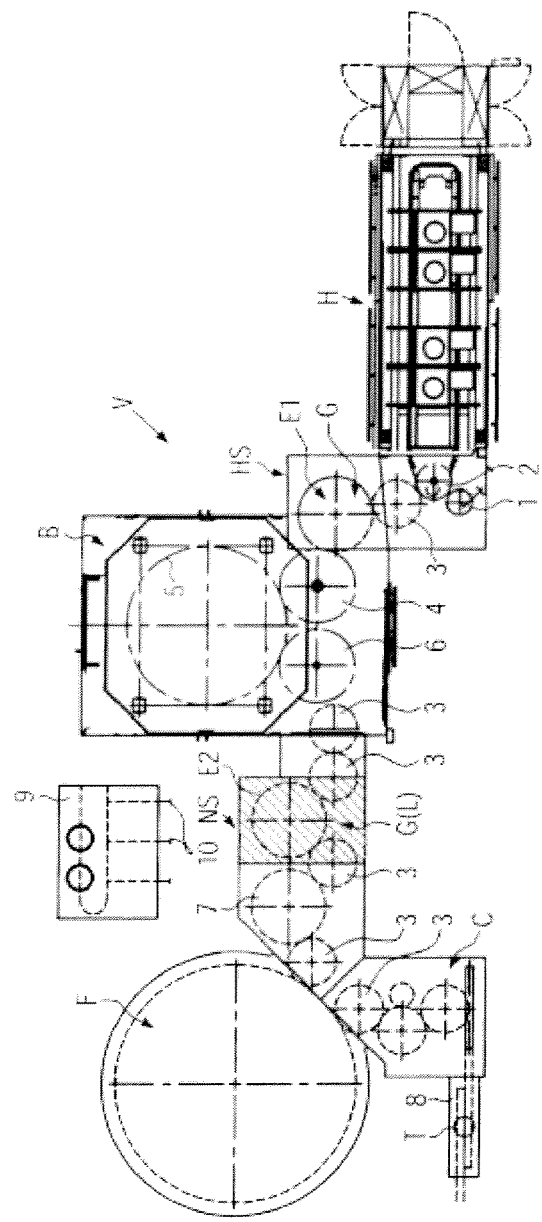
FIG. 1 shows a schematic plan view of a first embodiment of a device for blow molding and filling containers of preforms of a thermoplastic material.

FIG. 1 shows a device V for blow molding or stretch blow molding and filling sterile containers T. Preforms of thermoplastic material are supplied to a heating device H via a transport star 1. The preforms are introduced into the heating device H by this transfer star 1 and provided therein with a predetermined temperature profile, before they are subsequently brought to a main sterilization module HS via a transfer star 3 in which a main sterilization operation is performed at the preforms. The main sterilization module HS is inserted between the transport device 3 and a further transport device 4 of a blow module B in which a blow rotor 5 is arranged with non-depicted blow molds. As indicated by the solid outlines of the blow module B, the blow module B can be located at least in the region of the blow rotor 5 in a clean room environment. The blow molded or stretch blow molded containers T are transferred via a further transport device 6 to a transport device 3 and are brought to a subsequent sterilization module NS inserted between the transport device 3 and a filling machine F. Another transport device 7 or a washing and/or drying station can follow the subsequent sterilization module NS, from which the sterile containers are brought into the filling machine F via a transport device 3. At the outlet of the filling machine F, another transport device 3 brings the filled containers into a sealer C in which sterile closures are applied onto the containers T, and which is connected to a discharge conveyor device 8. In the main sterilization module HS and the subsequent sterilization module NS, one treatment star E1, E2 is contained each. The main sterilization treatment and the subsequent sterilization treatment in the modules HS and NS is for example performed in the embodiment in FIG. 1 with a medium G that is gaseous due to a thermal pretreatment, for example hydrogen peroxide, which is applied at high temperature and under pressure. As an alternative, reference numeral L indicates for the subsequent sterilization module NS that there the subsequent sterilization treatment employs a liquid medium, as for example on the basis of peracetic acid. A part of the device V can be furthermore a valve arrangement 9 connected to a supply (not shown), which provides the respective employed medium G or L under pressure, and from which supply conduits 10 lead to the modules HS and NS.

Figure 2:
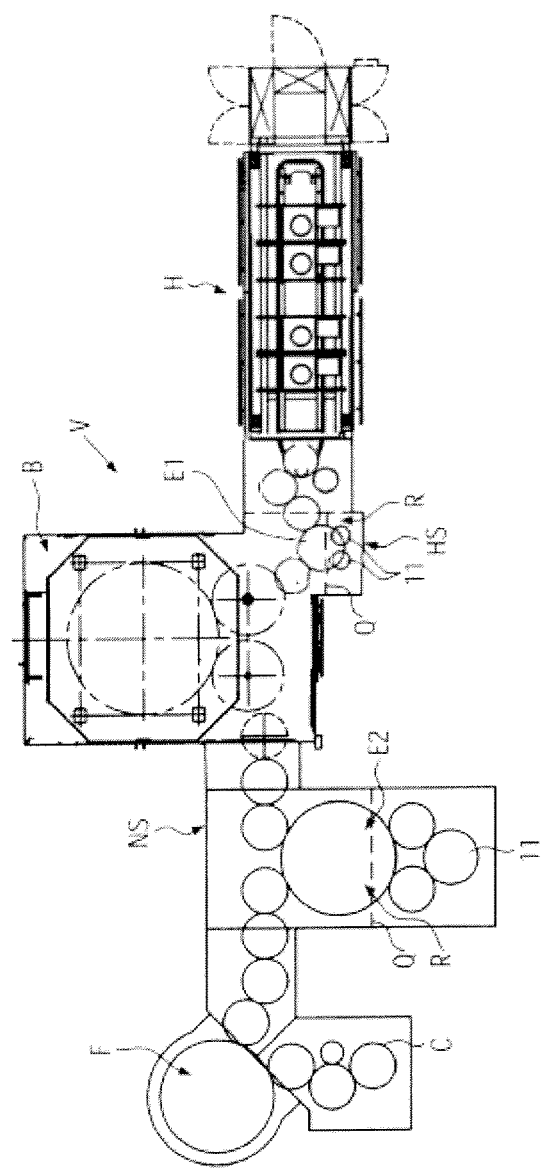
FIG. 2 shows a schematic plan view of another embodiment of the device.

The embodiment of the device in FIG. 2 differs from that in FIG. 1 in that the main sterilization module HS as well as the subsequent sterilization module NS operate with energy beams R in the respective sterilization treatment of the preforms and of the containers, with at least one generator 11 each for energy beams, wherein at least the generators 11 are appropriately each arranged in a shielded radiation trap Q.

In a non-depicted alternative to the embodiment of FIG. 2, the subsequent sterilization module NS of FIG. 1 operating with the gaseous medium G could be provided as subsequent sterilization module NS.

Figure 3:
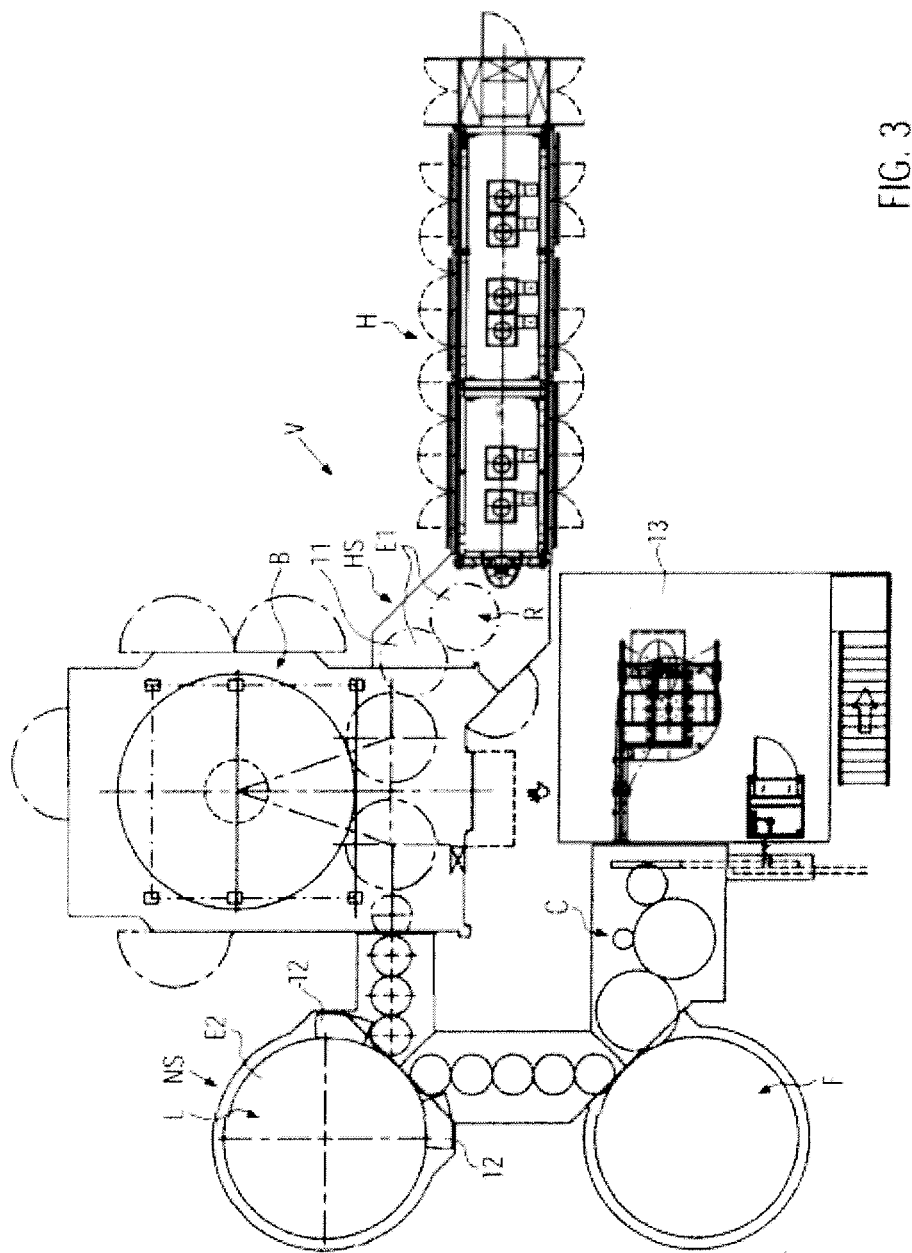
FIG. 3 shows a schematic plan view of another embodiment of the device.

The embodiment of the device V in FIG. 3 differs from the previous embodiments, among other things, in that the transport sections between the blow module B and the subsequent sterilization module NS and to the filling machine F are longer. Between the heating device H and the blow module B, the main sterilization module with the processing star E1 operates with energy beams R of at least one generator 11. Possibly, the generator 11 is provided next to the processing star E1 or integrated in the same. The subsequent sterilization module NS in FIG. 3 operates with liquid medium L (with hot pressure rinsing) and for this reason contains a larger treatment star E2 and turning devices 12 to turn the containers. A separate room 13 in which enclosures are held ready and possibly sterilized precedes the sealer C. The liquid medium L processed in the subsequent sterilization module is, for example, peracetic acid. The subsequent sterilization module NS operates e.g. as container washing machine.

In the embodiments of the device V in FIGS. 1 to 3, all treatment stars E1, E2 used in the modules HS, NS can practically only operate in the plane of rotation without lifting controls.

In an alternative, non-depicted embodiment, the device V of FIG. 1 could contain, instead of the subsequent sterilization module NS with the gaseous medium G, the subsequent sterilization module NS of FIG. 3 with the liquid medium L. Moreover, two or several treatment stars E1, E2 in the one and/or the other treatment module HS, NS are conceivable.

Figure 4:
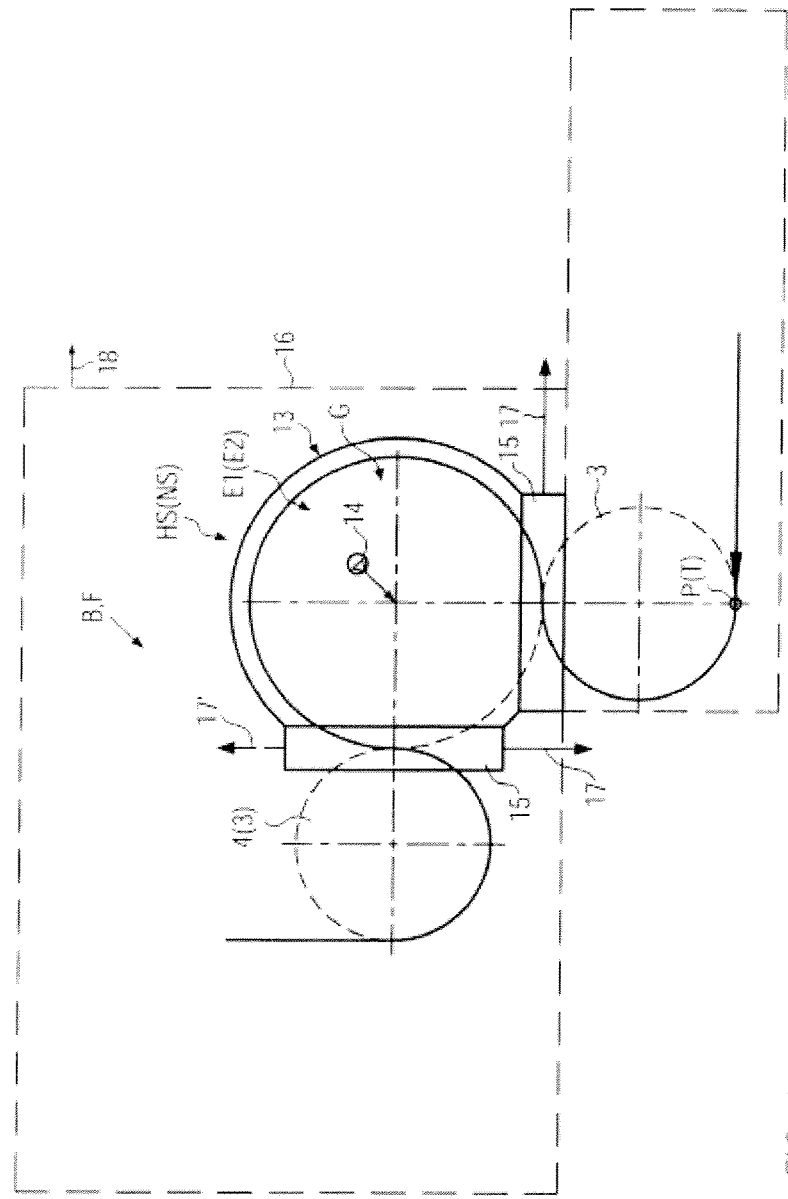
FIG. 4 shows a schematic plan view of a part of the device of FIGS. 1 to 3 for explaining an aeration principle in a sterilization treatment.

FIG. 4 explains an aeration system, for example for the main sterilization module HS (or the subsequent sterilization module NS, as an alternative or in addition), for example for the embodiment of the device of FIG. 1, in which sterilization is carried out with the gaseous medium G, such as hydrogen peroxide. The treatment star E1 is arranged in a treatment chamber 13 enclosing the same, which comprises exhaust air boxes 15 in the transitional regions from the transport device 3 for the preforms P (or the containers T) and to the transport device 3 or 4 which generate a lock-like effect. The treatment chamber 13 is connected to a source 14, for example for sterile air, which is permanently introduced into the treatment chamber 13. The treatment chamber 13 is located in the clean room environment 16 indicated by dashed lines to which an extraction system 18 can be connected. Exhaust air discharges 17 lead from the exhaust air boxes 15 to the outside, by bypassing the clean room environment 16. Optionally, extraction devices or valve means are provided to be able to control the exhaust air flows individually. As an alternative, at 17', an exhaust air conduit from an exhaust air box 15 into the clean room environment 16 is indicated.

The clean room environment 16 could belong to the blow module B and surround at least the blow rotor 5. Filtered clean or even sterile air could be introduced into the clean room environment 16, for example by a blower. The extraction via the exhaust air discharges 17 is recommended if an aggressive medium is employed in the treatment chamber 13 which should not reach the clean room environment 16 as there parts e.g. of the blow rotor could be damaged. The exhaust air boxes 15 from which the exhaust air can be extracted to the outside take care of this. To prevent a cross-flow in the treatment chamber 13, it can be appropriate to control the exhaust air flows, for example via adjustable flap valves (not shown).

For example, clean air is introduced into the treatment chamber 13 by means of nozzles (e.g. 80 Nm$^3$/h). The extraction via the exhaust air discharges 17 are adjusted such that a vacuum is formed in the treatment chamber 75. In the clean room environment 16, a resulting overpressure can be adjusted thereby.

A similar aeration principle can also be applied, as mentioned, in the subsequent sterilization module NS, where then the clean room environment 16 can be followed by another clean room of the filling machine F accessible via a passage, in which an even higher pressure of, for example, 20 Pa prevails as the hygienic requirements during filling are even higher than in the blow module B.

Figure 5:
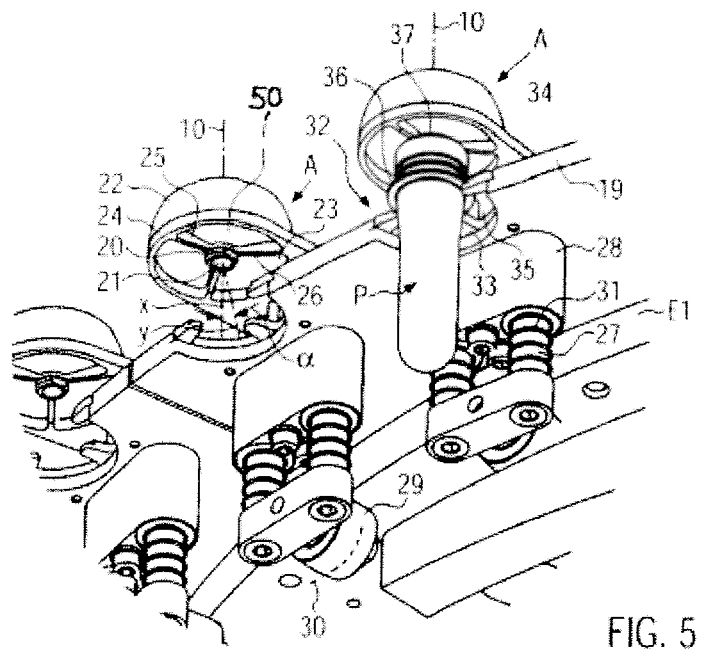
FIG. 5 shows a perspective bottom view of a detail of FIGS. 1 to 4.

FIG. 5 illustrates a detail of the treatment star E1 of the main sterilization module HS, for example the device V of FIG. 1. At the treatment star E1 which can be rotatingly driven about an e.g. vertical axis, an annular support star 19 is mounted which comprises application means A at regular distances along the outer periphery for applying the gaseous medium G. Each application means A comprises an approximately vertically located nozzle 20 which is connected to the connection conduit 10 to the valve means 9 of FIG. 1, appropriately via a central distributor above the treatment star E1. A nozzle opening 21 of the nozzle 20 with an axis X is oriented essentially centrically with respect to a fixation 32 for the respective preform P, however laterally inclined with respect to the axis Y of the preform P. The axes X and Y include a very acute angle α. The nozzle 20 is arranged in a bell body 22 which is arranged with its open bottom side on a supporting plate 24 which is fixed to at least one guide element 27, appropriately to be exchangeable. The supporting plate 24 (or the open bottom side of the bell body 22) contains several narrow bearing struts 25 distributed in the circumferential direction, between which wide cross-flow passages 50 are defined which lead to the interior of the bell body 22 and to baffle surfaces 23 provided there. The shape of the baffle surfaces is, for example, concavely rounded, corresponding to FIG. 7, to redirect a flow entering through the cross-flow passages 27 relatively centrally around the nozzle 20 and direct it again through the cross-flow passages 27 downwards onto the mouth region of the preform P. Appropriately, the bottom sides 26 of the bearing struts 25 recede gradually inclined upwards to the interior of the bell body 22, so that the nozzle 20 or the nozzle opening 21, respectively, projects over the bearing struts 25. As the outside diameter of the bottom side of the bell body 22 is considerably larger than the outside diameter of a mouth 37 of the preform P, the bell body 22 can be placed onto the mouth 37 such that the nozzle opening 21 somewhat enters into the mouth 37, and the outer edges of the cross-flow passages 27 come to lie underneath the plane of the mouth 37.

The guide element 27 (appropriately a pair of guide elements 27) is vertically movably guided in a sliding guide 28 at the bottom side 19 of the support star 19, and bears a jockey roller 29 at the lower end which in the relative rotation of the treatment star E1 cooperates phase-wise with a rum control 30 indicated in a dashed line to either lower the bell body 22 as shown, or to adjust it to a position lifted from the mouth 37. Appropriately, a spring 31 acts on the guide element 27 or the jockey roller 29, respectively, in the lowering direction of the bell body 22 onto the mouth 37 to clamp the respective preform P in the fixation 32. The fixation 32 is, for example, provided in a plate 33 exchangeably mounted on the support star 19 and is embodied like a mouth with several bearing fingers 34 between which spacious cross-flow passages 35 to a clearance zone located below are defined.

The preform P rests on the bearing fingers 34 with a supporting ring 36 underneath the mouth 37 and is clamped by the bell body 22 pressed on by the spring 31 approximately centrically to the bell body 22, while the gaseous medium G is blown into the preform through the nozzle 20.

Thanks to the inclined position of the nozzle opening 21 with respect to the axis Y of the preform P, the gaseous medium G is circulated intensively and in a spiral conduction of the flow over the inner wall of the preform P, before it exits from the mouth 37 towards the top, is redirected at the baffle surfaces 23 and then also acts on the external region of the preform P to the supporting ring 36 or even below it.

Figure 6:
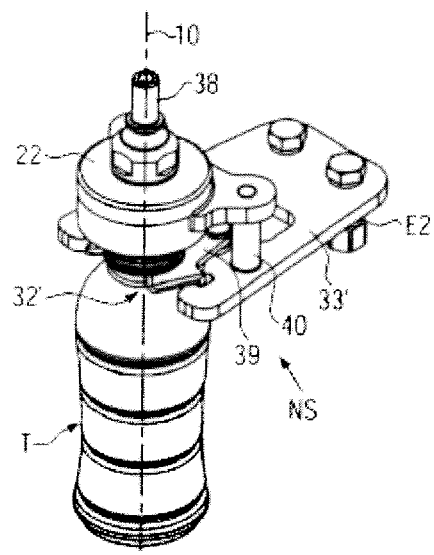
FIG. 6 shows a perspective view of a further detail.

FIG. 6 shows a similar structure for the treatment star E2 in the subsequent sterilization module, for example if a gaseous medium G is employed (alternatively with hot rinsing). The bell body 22 is here stationarily mounted on a plate 33' via support columns 40, which plate can be exchangeably mounted at the treatment star E2. A clamp gripper 39 at the supporting plate 33' is used as fixation 32' for the container T. At the top of the bell body 22, a connection 38 for the connection conduit 10 is arranged.

Figure 7:
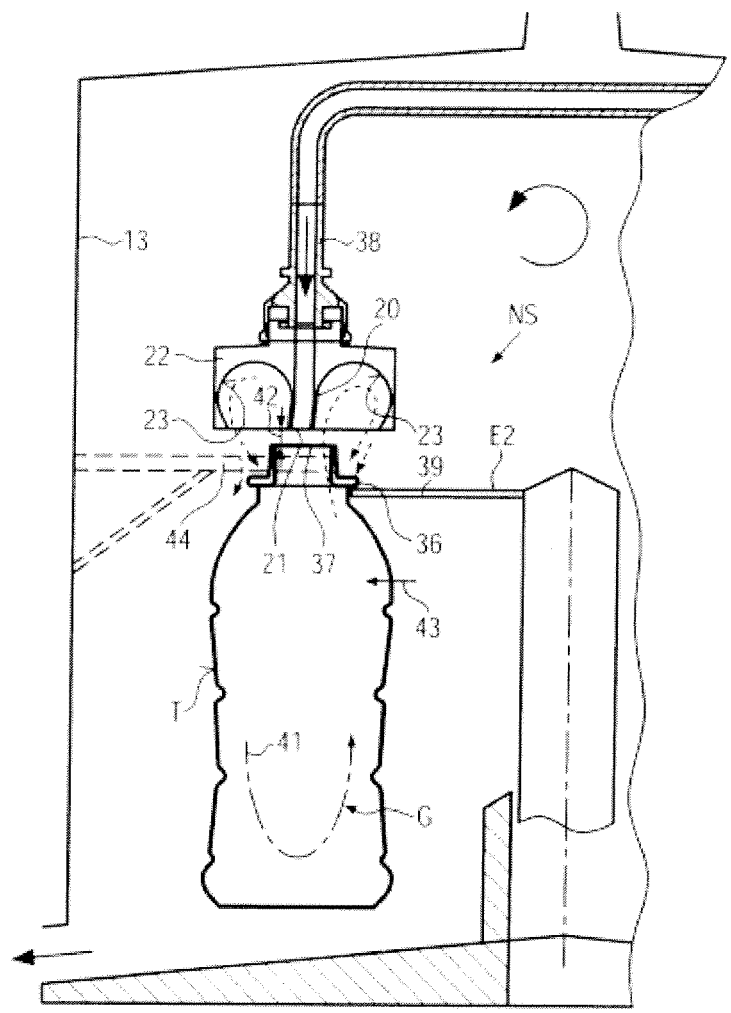
FIG. 7 shows a schematic sectional view of a further detail.

In FIG. 7, the treatment star E2 is arranged in the treatment chamber 13 in which it rotates about its indicated central axis. The bell body 22 is mounted to the support columns 40 such that its open bottom side as well as the inclined nozzle opening 21 is lying opposite to the central nozzle 20 of the mouth 37 of the container T (the mouth region with the mouth 37 and the supporting ring 36 has not been remarkably changed with respect to the design in the preform P) with a manipulation distance 42 to introduce the container T with an essentially only lateral movement (arrow 43) into the clamp gripper 39 or to withdraw it from the same. FIG. 7 shows the course of a flow 41 of the gaseous medium G, induced by the nozzle 20 and the inclined nozzle opening 21. The flow first runs directed at one side along the inner wall and the bottom of the container T, before it exits from the mouth 37 to the top and is redirected at the baffle surfaces 23 in the bell body such that the flow also acts on the external region of the mouth region of the container T.

To prevent disturbances in the transfer of the container T to the transport device (e.g. the transport device 3), a guiding-out finger 44 (also see FIG. 8) can be provided in the transfer region, which in FIG. 7 acts above the supporting ring 36 or the clamp gripper 39 at the container T to transfer the same in the direction of the arrow 43. As an alternative (not shown), the guiding-out finger could be arranged underneath the clamp gripper 39.

Figure 8:
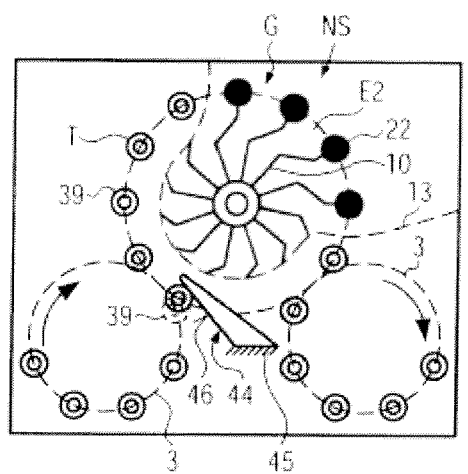
FIG. 8 shows a schematic plan view, for example of FIG. 5 or FIG. 7.

According to FIG. 8, the guiding-out finger 44 is stationarily arranged in the subsequent sterilization module NS and in the transfer region from the treatment star E2 to the transport device 3 such that it acts at the back side of the container T facing away from the transport device 3 and shifts the same out of the clamp gripper 39, for example into a clamp gripper 39 of the transport device 3. The guiding-out finger 44 is stationarily mounted in a bearing 45 and comprises a guiding-out surface 46 arranged diagonally with respect to the motion path of the container T at the treatment star E2.

The guiding-out finger 44 could also be employed in the treatment star E1 of the main sterilization mode HS, to there very securely transfer the preform P without any harmful contact with other components. The guiding-out finger 44 is only an appropriate option for safety reasons, but no necessity.

Figure 9:
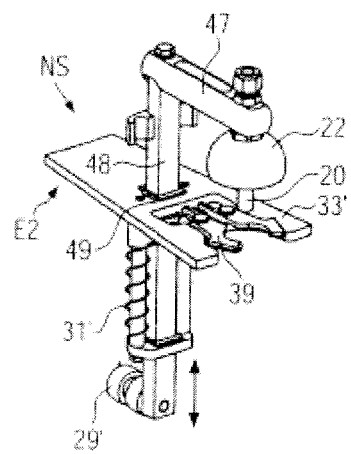
FIG. 9 shows a perspective representation of a further detail as an alternative to FIG. 6.

FIG. 9 finally shows a detail variant of the treatment star E2 of the subsequent sterilization mode NS. The bell body 22 is here adjustable by means of a lifting control 47, 48, 29', 31' to be lifted and lowered relative to the clamp gripper 39. The nozzle 20 clearly projects from the bell body 22. The lifting control consists of an 47 at which the bell body 22 and the nozzle 20 are mounted, a vertical guide element 48 and a jockey roller 29' for cooperation with a cam control. Optionally, a spring 31' acts on the lifting control in the lowering direction to press the lowered bell body 22 onto the mouth of the container T. The guide element 48 can be moved in a sliding guide 49 of the plate 33'. The embodiment of FIG. 9 can be considered as alternative embodiment of FIG. 6, and it can also be used in connection with the guiding-out finger 44 of FIG. 7.

The invention claimed is:

1. Method for blow molding or stretch blow molding and filling sterile containers made from preforms, in particular plastic bottles, in a container treatment machine having blow molds in a blow module, comprising
    transferring the preforms from a heating device via transport devices into the blow molds,
    performing a main sterilization treatment of the preforms at a treatment star in a treatment chamber between the heating device and the blow module in a clean room environment,
    obtaining a sterile state of the preforms during the main sterilization treatment by performing the main sterilization treatment with gaseous medium and/or with electric beams and by permanently introducing a sterile air flow into the treatment chamber, and blowing off or extracting air from the treatment chamber via exhaust air boxes surrounding preform transfer regions,
    shaping the preforms into the containers in the blow molds,
    transporting the containers from the blow molds to a filling machine,
    performing an after-sterilization treatment of the containers as a precaution and during short resident time with a gaseous and/or liquid medium and/or electronic beams in a single after-sterilization module before placing the containers in the filling machine,
    filling the containers.

2. Method according to claim 1, wherein the gaseous medium is thermally processed hydrogen peroxide.

3. Method according to claim 1, wherein the liquid medium is on the basis of peracetic acid.

4. Device for blow molding or stretch blow molding and filling sterile containers made from preforms in a container treatment device, comprising:
    a heating device for the preforms;
    a first preform transport device following the heating device;
    a main sterilization module for the preforms following the first preform transport device comprising:
        a clean room environment treatment chamber having exhaust air boxes covering supply and discharge areas,
        an aeration source connected to the treatment chamber, at least one treatment star arranged in the treatment chamber, and either a supply and application means for a gaseous and/or liquid sterilization medium or at least one electron beam generator for applying electron beams onto and/or into the preforms;

a second preform transport device following the main sterilization module;

blow molds in a blow module following the second preform transport device;

a first container transport device following the blow module;

an after-sterilization module following the first container transport device comprising:
a clean room environment treatment chamber having exhaust air boxes covering supply and discharge areas,
an aeration source connected to the treatment chamber,
at least one treatment star arranged in the treatment chamber,
and either a supply and application means for a gaseous and/or liquid sterilization medium or at least one electron beam generator for applying electron beams onto and/or into the preforms;

a second container transport device following the after-sterilization module;

a filling machine following the second container transport device.

5. Device according to claim 4, wherein the exhaust air boxes comprise adjustable exhaust air valves.

6. Device according to claim 4, wherein the application means for the gaseous and/or the liquid medium in the main sterilization module and/or after-sterilization module each comprise one bell body open at the bottom side and arranged at the treatment star with internal baffle surfaces for the external treatment of the preform or the container, and a central nozzle, which has a nozzle opening inclined to the side with respect to the axis of the preform or of the container.

7. Device according to claim 6, wherein the bell body is arranged at a lifting control device of the treatment star to be lifted and lowered relative to a fixation for the preform or the container.

8. Device according to claim 6, wherein each bell body in the main sterilization module comprises several narrow bearing struts, wherein the bearing struts are either provided on the bottom side of the bell body or are located on an exchangeably mounted plate attached to the bottom side of the bell body and wherein the bearing struts recede from a peripheral edge to the nozzle such that the nozzle opening projects downwards with respect to the bearing struts, and several wider cross-flow passages to and from the baffle surfaces defined in the bell body between the bearing struts.

9. Device according to claim 7, wherein the fixation in the main sterilization module and/or the after-sterilization module is a clamp gripper that can be applied under a supporting ring of the container, and a stationary guiding-out finger is mounted underneath or above a motion path of the clamp gripper, the finger extending diagonally with respect to the motion path of the container arranged in the clamp gripper in the treatment star such that the finger can be brought against the side of the container facing away from the second preform transport device or the second container transport device and adjacent to the supporting ring to assist with transfer from the main sterilization module to the second preform transfer device or from the after-sterilization module to the second container transfer device.

10. Device according to claim 7, wherein the fixation for the preform at the treatment star comprises several supporting fingers for a preform supporting ring and further comprises defined cross-flow passages between the supporting fingers to a clearance zone located below, and wherein the lifting control device comprises at least one guide element supporting the bell body which is movably guided in the treatment star and can be moved essentially in parallel to the axis of the preform via a jockey roller by a cam control, and wherein a preform fixing spring acts on the guide element or the jockey roller in the set-down direction of the bell body with bearing struts on the mouth of the preform resting with the supporting ring on the supporting fingers.

* * * * *